United States Patent

[11] 3,566,148

| [72] | Inventor | Peter Wood<br>Pittsburgh, Pa. |
|---|---|---|
| [21] | Appl. No. | 705,481 |
| [22] | Filed | Feb. 14, 1968 |
| [45] | Patented | Feb. 23, 1971 |
| [73] | Assignee | Westinghouse Electric Corporation<br>Pittsburgh, Pa. |

[54] SELECTIVE PHASE ANGLE PULSE GENERATING CIRCUIT
10 Claims, 2 Drawing Figs.

[52] U.S. Cl................................................ 307/106,
323/22, 307/301, 307/133, 307/235
[51] Int. Cl............................................................ H03k 3/00
[50] Field of Search............................................. 307/106,
151; 323/22 (SCR); 321/45; 219/10.77, 488, 501;
307/141, 293, 301, 130, 133; 328/135; 307/235

[56] References Cited
UNITED STATES PATENTS

| 3,226,627 | 12/1965 | Fromkin............... | 323/22SCR |
| 3,147,928 | 9/1964 | Carpenter............. | 323/22SCR |
| 3,024,427 | 3/1962 | Van Der Horst et al...... | 219/10.77X |
| 3,273,041 | 9/1966 | Strohmeier et al......... | 321/4 |
| 3,319,147 | 5/1967 | Madham................ | 321/45X |
| 3,356,784 | 12/1967 | Bertioli et al............. | 323/22SCR |
| 3,360,710 | 12/1967 | Barthold................ | 321/45X |
| 3,398,352 | 8/1968 | Jamieson................ | 321/45 |

OTHER REFERENCES
SCR Manual, General Electric, 4th Edition pp. 79—80(4.14.2.3). 1967

*Primary Examiner*—Robert K. Schaefer
*Assistant Examiner*—H. J. Hohauser
*Attorneys*—F. H. Henson, C. F. Renz and A. S. Oddi ABSTRACT: The present disclosure relates to circuitry for generating an output pulse at a selected phase angle with respect to an alternating signal independent of the amplitude and frequency thereof. The circuit is ideally adapted for use in induction heating apparatus employing an inverter drive including controlled switching devices operative to supply an alternating signal to a tuned load including an induction heating coil. The circuit is operative to generate the output pulse by detecting, through peak detection for example, the substantial peak of the alternating signal and comparing, through an active device for example, a selected portion of the peak value with the instantaneous value of the alternating signal. An output pulse at the selected phase angle is provided when the compared signals bear a predetermined relationship with respect to each other.

SELECTIVE PHASE ANGLE PULSE GENERATING CIRCUIT

BACKGROUND OF THE INVENTION

The present invention relates to pulse generating circuitry and, more particularly, to such circuitry for generating a pulse at a selected phase angle with respect to an alternating signal which may vary in frequency and amplitude.

The use of an inverter to drive a parallel tuned load in induction heating apparatus has a number of significant advantages over the more standard usage of a motor-generator set. The motor-generator set is normally designed for operation at substantially constant frequency to correspond with the selected tuned frequency of the tuned load which includes an inductive heating coil for receiving a workpiece and a parallel connected capacitor or capacitors. Because of the fixed frequency of motor-generator drives they greatly limit the adaptability of the induction heating apparatus requiring the use of a separate motor-generator set whenever the load is changed, for example, by changing the heating coil. Also, when using a motor-generator set, even relatively small changes in the tuned frequency of the load will affect the power factor of operation and, therefore, the efficiency of power transfer to the workpiece. Changes in the tuned frequency of the load may be caused by the workpiece going through its Curie temperature or movement of the workpiece relative to the induction heating coil. To compensate for changes in the tuned frequency in the motor-generator type of system, the value of the parallel connected capacitor or capacitors must be changed which requires relatively complex switching techniques while still only providing partial compensation.

Utilizing an inverter type of drive for a parallel tuned load provides the significant advantage of permitting operation over a wide range of frequencies, and hence allowing the use of a variety of inductive heating coils with the same inverter. Through the use of controlled switching devices, such as silicon controlled rectifiers, in the inverter the operating frequency of the inverter may be rapidly changed by varying the rate at which gating pulses are applied to the controlled switching devices. It would thus be highly desirable that if in response to changes in the tuned frequency of the load the frequency of operation of the inverter could be varied to compensate for the change and maintain high efficiency of operation independent of the tuned frequency of the load.

In induction heating it is important that the voltage across the tuned load remains substantially constant in order to insure controlled heating of the workpiece. In that the voltage across a tuned load in an inverter is proportional to the ratio of the DC supply voltage of the inverter to the cosine of the angle of the alternating signal across the load, if the phase angle can be maintained constant, the voltage across the load can also be maintained substantially constant. It would therefore be highly desirable if the inverter were capable of operation at a substantially constant phase angle with respect to the alternating signal across the tuned load independent of the amplitude and frequency of this alternating signal.

SUMMARY OF THE INVENTION

The present invention provides a new and improved circuit for providing an output signal at a selected phase angle with respect to an alternating signal which may vary in amplitude and frequency by providing a detected signal proportional to the substantial peak amplitude of the alternating signal and comparing this detective signal with the instantaneous value of the alternating signal, with the output signal being provided when compared signals bear a predetermined relationship with respect to each other.

DESCRIPTION OF THE PREFERRED EMBODIMENT

Figure 1:
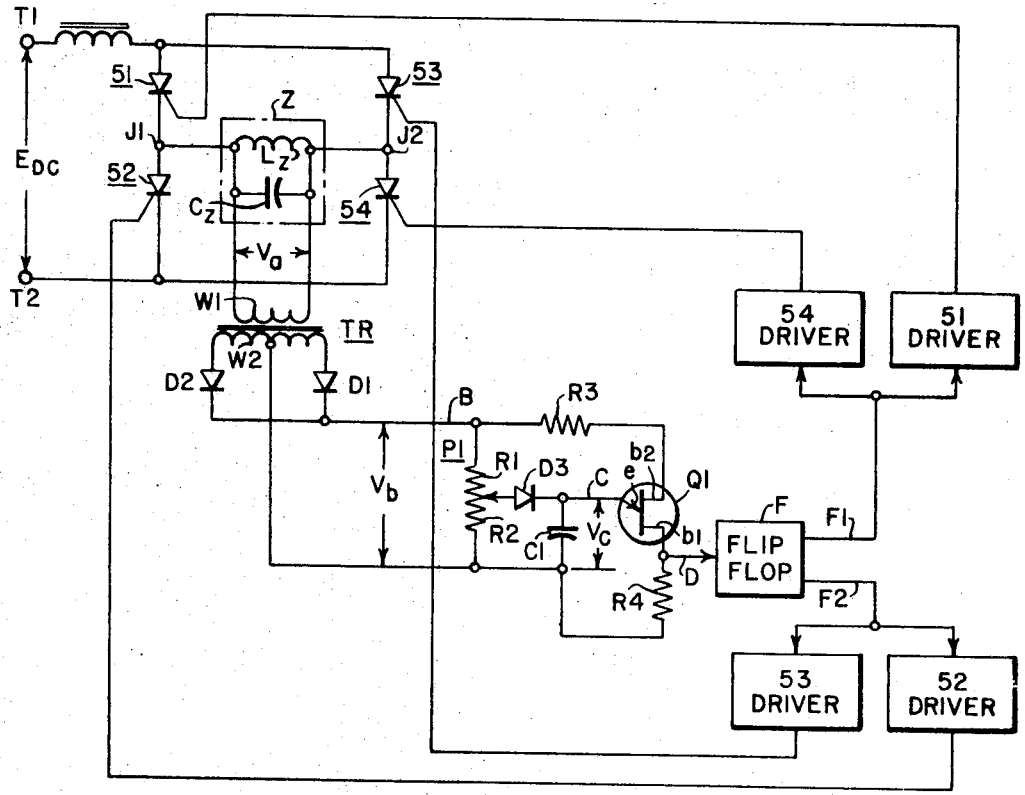
FIG. 1 is a schematic block diagram of induction heating apparatus utilizing the teachings of the present invention.

Referring to FIG. 1, induction heating apparatus is shown utilizing an inverter drive for supplying a parallel tuned load Z. The parallel tuned load Z includes an induction heating coil Lz and a capacitor Cz connected in a parallel circuit relationship therewith. In order to heat a workpiece, the workpiece is placed in the magnetic field of the induction heating coil Lz for inducing eddy currents therein as is well known in the induction heating art. The tuned resonant frequency of the parallel combination of the heating coil Lz and the capacitor Cz is so selected to have a predetermined value for the desired heating application. The inverter for supplying the tuned load Z includes four controlled switching devices S1, S2, S3 and S4 connected to a two-leg bridge array. The controlled switching devices may for example comprise silicon controlled rectifiers or other equivalent device. In the first leg of the bridge the cathode of the controlled rectifier S1 is connected to the anode of the controlled rectifier S2 forming a junction S1 at the cathode-anode connection. In the second leg of the bridge the cathode of the rectifier S3 is connected to the anode of the controlled rectifier S4 forming a junction S2 at the cathode-anode connection. The parallel tuned load Z is connected between the cathode-anode junctions J1 and J2 of the legs of the bridge. A DC supply voltage $E_{dc}$ is provided for the inverter and is connected between a pair of terminals T1 and T2 with terminal T1 being positive. A ballast inductor L1 is connected the terminal T1 and the anodes of the controlled rectifiers S1 and S3 which are commonly connected. The cathodes of the controlled rectifiers S2 and S4 are commonly connected to the terminal T2. A bidirectional current is supplied through the load Z by the selective switching of the controlled rectifiers so that during a first half-cycle the controlled rectifiers S1 and S4 are gated on, while the controlled rectifiers S2 and S3 are commutated off, and then during the next half-cycle, the controlled rectifiers S3 and S2 are gated on and the controlled rectifiers S1 and S4 are turned off. The commutation of the pair of controlled rectifiers conductive during the previous half-cycle is effected through a reverse bias applied thereacross by the voltage developed across the capacitor Cz during that half-cycle. The turning on of the other pair of controlled rectifiers applies this reverse bias across the previously conductive pair which causes them to be reset for the next half-cycle of inverter operation. The ballast inductor L1 serves as a current limiting coil to supply a substantially constant current to the load circuit Z and to smooth out any sudden current excursions due to the switching action of the controlled rectifiers. The operation of the inverter is such that a constant current, the magnitude of which is determined by the source voltage $E_{dc}$ and the effective load resistance is parallel with Cz and Lz, is switched into the parallel tuned circuit Lz and Cz in opposite directions during alternate half-cycles. Thus with a square wave of current being switched into the tuned circuit, a sinusoidal voltage Va is developed thereacross, which is shown as the voltage waveform Va in curve A of FIG. 2.

The instantaneous value of this voltage Va may then be defined by the equation:

$$Va = V'a \sin \theta,$$

where V'a is the peak value of the sinusoidal waveform and $\theta$ is the angular displacement thereof. On a time base, $\theta$ would be equal to $2\pi ft$, where $f$ is the frequency of the waveform and $t$ is time.

Taking the ratio of the instantaneous value Va to the peak value V'a, we find:

$$\frac{Va}{V'a} = \frac{V'a \sin \theta}{V'a} = \sin \theta$$

It can thus be seen that the ratio of the voltage Va at a given phase angle $\theta$ to the peak voltage V'a of the sine wave is not a function of either amplitude or frequency of the sine wave.

Therefore, by the comparison of the instantaneous value of the sine wave with its peak value an indication can be obtained when this ratio reaches a predetermined value which will be indicative of a predetermined phase angle. In other words, when the ratio of instantaneous to peak is at a given value independent of amplitude or frequency of the sine wave, the waveform will be at a predetermined phase angle. The circuitry as shown in FIG. 1 utilizes this concept for providing an output pulse whenever the ratio of instantaneous to peak value of the sine wave reaches a desired value with the time at which the pulse is generated being indicative of a selected phase angle delay with respect to the particular half-cycle of the sine wave being sensed.

It should be understood that wave shape $Va$ may not be exactly a sinusoid, but, due to the finite switching times of the controlled rectifiers S1, S2, S3 and S4, the wave shape may differ somewhat from a pure sinusoid. However this does not affect the operation of the circuitry as discussed herein and for the purposes of simplicity it will be considered to be a substantially pure sinusoidal waveform.

The voltage $Va$ developed across the parallel tuned load Z is applied to the primary winding W1 of a transformer TR which has a center tapped secondary winding W2. The transformed voltage appearing across the secondary winding W2 is full wave rectified by a pair of diodes D1 and D2 which have their anodes connected to the respective ends of the winding W2 and their cathodes commonly connected at a point B, so that a full wave rectified output voltage $Vb$ appears between the point B and the center tap of the winding W2 as indicated in FIG. 1. The full wave rectified waveform $Vb$ is shown in curve B of FIG. 2.

Between the point B at the cathodes of the diodes D1 and D2 and the center tap of the winding W2 is connected a potentiometer P1 for receiving across the ends thereof the voltage $Vb$. The potentiometer P1 includes a resistive section R1 between the point B and the slider thereon and a resistive section R2 between the slider and the center tap of the winding W2. Thus, the voltage appearing at the slider of the potentiometer P1 with respect to the center tap of the winding W2 may be selected by adjusting this slider to the desired ratio of R2:R1 + R2. The fraction of the voltage $Vb$ which appears across the resistor R2 is utilized to select the phase angle at which output pulses are generated in the pulse generating circuit as will presently be explained.

Connected across the resistor R2 is a peak detecting circuit including a diode D3 and a capacitor C1. The diode D3 is connected from anode to cathode between the slider on the potentiometer P1 and the emitter electrode $e$ of a unijunction transistor Q1. The capacitor C1 is connected between the junction of the cathode of the diode D3 and the emitter $e$ of the unijunction transistor Q1 and the center tap of the winding W2. The total voltage waveform $Vb$ is applied at the interbase voltage for the unijunction transistor Q1 through a current limiting resistor R1 connected between the point B and the second base $b2$ of the unijunction transistor Q1 and a load resistor R4 connected between the center tap of the winding W2 and the first base $b1$ of the unijunction Q1. The output of the unijunction transistor Q1 is taken at the first base $b1$ thereof at a point D and applied to a flip-flop circuit F.

Figure 2:
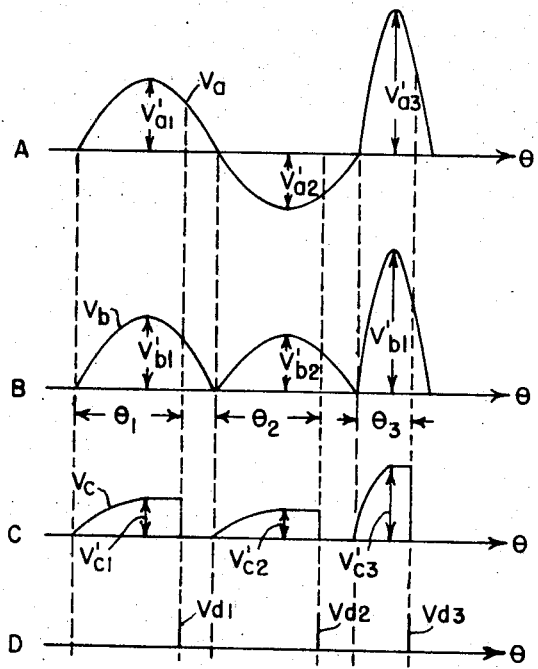
FIG. 2 is a waveform diagram including curves A, B, C and D which are utilized in explaining the operation of FIG. 1.

The fraction of the voltage $Vb$ appearing across the resistor R2 of the potentiometer P1 is thus peak detected in the diode D3 and the capacitor C1 with the capacitor C1 charging according to the voltage waveform $Vc$ as shown in curve C of FIG. 2. During the first 90° of the waveform $Vb$, the capacitor C1 will charge to a peak value which is proportional to the peak value $V'b'$ of the voltage $Vb$. After the peak of the waveform $Vb$ has been reached at $\theta = 90°$, during the second portion of the half-cycle the instantaneous voltage $Vb$ begins to decrease as shown in curve B of FIG. 2. However, due to the diode D3 the emitter-base junction of the unijunction transistor Q1, the capacitor C1 will maintain its substantial peak charge $V'c$ with this voltage $V'c$ being applied to the emitter $e$ of the unijunction transistor Q1. After $\theta = 90°$, the interbase voltage $V2$-$1$ of the unijunction Q1 drops following the instantaneous value of the voltage $Vb$, while the emitter-first base voltage $Vc$-$1$ remains substantially constant at the peak of the half-cycle $V'c1$ as indicated in curve C of FIG. 2. The unijunction Q1 will remain in its blocking state until the standoff ratio thereof is exceeded, with the standoff ratio being defined as the rating of the interbase voltage $V2$-$1$ to the emitter first base voltage $Vc$-$1$. Thus, when the instantaneous value of the voltage $Vb$ in curve B of FIG. 2 drops to a value such that the emitter to first base voltage $Vc$-$1$ exceeds a predetermined fraction thereof, the unijunction transistor Q1 will fire discharging the capacitor C1 through the emitter-first base circuit thereof and through the resistor R4 in the base circuit thereof to produce a voltage pulse $Vd1$ as shown in curve D of FIG. 2. The output pulse $Vd1$ is produced after an angle $\theta 1$ from the beginning of that half-cycle as indicated. In a typical unijunction transistor the standoff ratio $Vc$-$1/Vz$-$1$ is approximately 0.55 for the firing of the device.

The output pulse $Vd1$ of the unijunction Q1 is supplied to the flip-flop F which changes its output state from its previous state. Assume that prior to the time that the angle Q1 is reached that the controlled rectifiers S1 and S4 were conducting with the flip-flop F being in its first output state $f1$. The application of the pulse $Vd1$ to the input thereof switches its state to the second output state $f2$ state and supplies an output pulse therefrom. The pulse from the $f2$ state of the flip-flop F is supplied to an S2 driver and an S3 driver which are connected respectively, to the gate electrodes of the controlled rectifiers S2 and S3. The S2 and S3 drivers are operative to supply gate drive pulses to these controlled rectifiers in response to the pulse output of the flip-flop F at its output F2. Thus the controlled rectifier pair S2—S3 is gated on, with the load capacitor $Cz$ reverse biasing the controlled rectifier pair S1 and S4 to commutate these devices off. The flip-flop F remains in its F2 output state until another output pulse from the unijunction Q1 is applied thereto to the input thereof.

The angle $\theta 1$ at which the output pulse $Vd1$ is generated by the unijunction transistor Q1 may be varied by the adjustment of the slider on the potentiometer P1 either to cause the output pulse $Vd1$ to occur at a time near to the peak of the half-cycle of the waveform $Vb$ or at the time later in the half-cycle.

Assume that during the next half-cycle of the waveform $Va$ appearing across the load Z that the negative peak $V'a2$ thereof is at a smaller magnitude (absolute) than that of the positive preceding half-cycle. The rectified output voltage $Vd$, shown in curve B of FIG. 2, will thus have a peak value $V'b2$, which is smaller than $V'b1$. The fraction determined by the potentiometer P1 is peak detected by the peak detector circuit including the diode D3 and the capacitor C1 to provide the voltage $Vc$ across the capacitor C1, as shown in curve C as having a peak magnitude $V'c2$ which is maintained after the peak of that half-cycle until an angle $\theta 2$ is reached.

The unijunction transistor Q1 will fire when the standoff ratio is exceeded. The standoff ratio will be exceeded at the angle $\theta 2$ as measured from the beginning of that half-cycle. The angle $\theta 2$ will be equal to the angle $\theta 1$ since the ratio of the instantaneous value of the sinusoid to its peak value is a constant equal to the sine of that angle as previously shown. Therefore even though peak magnitude of $V'a2$ is smaller than the peak magnitude $V'a1$, the phase angle $\theta 2$ will still be equal to the phase angle $\theta 1$ in that the unijunction transistor Q1 is activated when the ratio of the instantaneous value of the sine wave compared to its peak value reaches a predetermined value. This predetermined value is the same for both cases because the activation of the unijunction transistor Q1 occurs when its standoff action, a constant of the device, is reached. From the foregoing it can be seen that pulse output will be generated at the point D in the circuit of FIG. 1 independent of the amplitude of the incoming sinusoidal wave shape, and the output will occur at the same phase angle with respect to that half-cycle of operation as long as the setting on the potentiometer P1 is maintained at a fixed position.

The pulse V$d2$ generated at the phase angle $\theta2$ is applied to the flip-flop F which changes its output state from F2 to F1, with the pulse output at F1 being applied to an S1 driver and an S2 driver, which in turn supply the gate drive to the controlled rectifiers S1 and S4, respectively. In response to the gate drive, controlled rectifier pairs S1—S4 are turned on and the pair of controlled rectifiers S2—S3 previously conductive are commutated off in response thereto, with the circuit being reset then for the next half-cycle of operation.

Now assume during the next half-cycle of the waveform V$a$ that the amplitude thereof increases to double that of the peak amplitude V'$a1$ of the first half-cycle and that the frequency thereof is also doubled. As can be seen from curve B of FIG. 2 the full wave rectified output applying the voltage waveform V$b$ has doubled the peak amplitude V'$b$ 3 as compared to the peak amplitude V'$b$' of the first half-cycle with the frequency being doubled. The half-cycle having the peak magnitude V'$b3$ is peak detected via the diode D3 and capacitor C1 to supply the waveform as shown in curve C having a peak magnitude V'$c3$, with the peak magnitude being maintained until a phase angle $\theta3$ is reached in that half-cycle.

An output pulse V$d3$, as shown in curve D of FIG. 2, is provided at the time in the half-cycle as defined by the angle $\theta3$ when standoff ratio of the unijunction transistor Q1 is exceeded. As previously explained this will occur when the ratio of the instantaneous value of sinusoidal waveform V$a$ reaches a predetermined fraction of its peak magnitude. Since this predetermined fraction is set by the potentiometer P1, the phase angle with respect to that half-cycle at which this fraction will be met will be the same with the angle $\theta3$ being equal to the angles $\theta2$ and $\theta1$. The actual time, of course, between the start of the third half-cycles and the generation of the output pulse V$d3$ is only one-half of the time for the generation of the pulses V$d1$ and V$d2$ from the respective beginnings of their half-cycles due to the doubling of the frequency. However, the angular delay with respect to each of the half-cycles is the same, and, as shown in the curves, this angle has been set so that $\theta1$, $\theta2$, and $\theta3$ are equal to 135° from the beginning of their respective half-cycles. It can thus be seen that the phase angle at which an output pulse is generated is fixed in angular displacement for each half-cycle independent of the magnitude and frequency of the particular half-cycle being sensed.

The output pulse V$d3$ is then applied to the flip-flop F which causes it to revert to its F2 state with the S2 and S3 drivers respectively providing gate drive for the controlled rectifiers S2 and S3 to reset the inverter for the next half-cycle of operation.

The circuit as described in FIG. 1 is operative over a relative wide range of variations in amplitude levels of the voltage V$a$, being limited to maximum amplitude by the maximum intervase voltage sustainable by the unijunction transistor Q1 and being limited at low voltage levels to when the forward voltage of the diode D3 becomes a significant percentage of the total voltage being sensed. The circuit is operative over a wide range of frequencies, being only limited at upper frequencies and by the time constant which will permit the charging of the capacitor C1 to substantially peak amplitude during each half-cycle and at the lower frequency end by the leakage of the capacitor C1.

The pulse generating circuit for generating a pulse at a fixed phase angle independent of frequency and amplitude of the voltage being sensed has been described as being incorporated into induction heating apparatus. However, it should be understood that circuitry could be used in many other applications requiring the generation of pulses or other indications at a fixed or selected phase angle for control or other purposes.

Although the present invention has been described with a certain degree of particularity, it should be understood that the present disclosure has been made by way of example and that numerous changes in the details of construction and the combination and arrangement of parts, elements and components can be resorted to without departing from the spirit and scope of the present invention.

I claim:

1. A circuit for providing an output signal at a selected phase angle with respect to an alternating signal which may vary in amplitude and frequency comprising:
   means for peak detecting a portion of said alternating signal and providing a detected signal proportional to the substantial peak amplitude of said alternating signal; and
   means for comparing said detected signal with the instantaneous value of said alternating signal and providing said output signal when said detected signal and said instantaneous value bear a predetermined relationship with respect to each other.

2. The circuit of claim 1 wherein:
   said detected signal being proportional to the substantial peak magnitude of each half-cycle of said alternating signal, and
   said means for comparing being operative to provide said output signal during each half-cycle at said selected phase angle after the peak magnitude has been reached and said predetermined relationship exists.

3. The circuit of claim 2 wherein:
   said means for detecting including a storage element for storing said detected signal and a unidirectional device for maintaining said detected signal until said predetermined relationship exists.

4. The circuit of claim 3 wherein:
   said means for comparing including a comparison stage for receiving said detected signal at one input thereof and said instantaneous value at another input thereof to provide said output signal at an output thereof in response to the comparison of said inputs to said stage bearing said predetermined relationship.

5. The circuit of claim 4 including:
   means for full wave rectifying said alternating signal; and
   means for supplying a selected portion of the full wave rectified alternating signal to said means for detecting, said means for supplying being adjustable to vary said selected phase angle.

6. The circuit of claim 5 wherein:
   said comparison stage including an active device for receiving said detected signal across a first pair of electrodes thereof and said instantaneous value across a second pair of electrodes thereof and providing said output signal at one of said electrodes when said instantaneous value reaches a predetermined fraction of said detected signal.

7. The circuit of claim 6 wherein:
   said storage element comprising a capacitor and said unidirectional device comprising a diode, said diode operatively connected between said means for supplying and said capacitor, said capacitor operatively connected across said first pair of electrodes of said active device, said active device comprising a unijunction transistor.

8. In induction heating apparatus utilizing an inverter having a plurality of controlled switching devices for supplying an alternation signal to a tuned load, the combination of:
   means for sensing said alternating signal developed across said load;
   a pulse generating circuit for providing an output signal at a selected phase angle with respect to said alternating signal and comprising,
   means for peak detecting a portion of said alternating signal and providing a detected signal proportional to the substantial peak magnitude of said alternating signal, and
   means for comparing said detected signal with the instantaneous value of said alternating signal and providing said output signal when said detected signal and said instantaneous value bear a predetermined relationship with respect to each other; and
   means for utilizing said output pulse from said pulse generating circuit for controlling the switched state of said plurality for controlled switching devices of said inverter.

9. The combination of claim 8 wherein:
   said detected signal being proportional to the substantial peak magnitude of each half-cycle of said alternating signal, and said means for comparing being operative to provide said output signal during each half-cycle at said selected phase angle after the peak magnitude has been reached and said predetermined relationship exists.

10. The combination of claim 9 wherein:

said means for detecting including a storage element for storing said substantial peak magnitude and a unidirectional device for maintaining said substantial peak magnitude until said predetermined relationship exists.